United States Patent

[11] 3,626,266

[72] Inventors Emmett F. Sindelar
 Parma;
 John Klein, Fairview Park, both of Ohio
[21] Appl. No. 844,803
[22] Filed July 25, 1969
[45] Patented Dec. 7, 1971
[73] Assignee The Warner & Swasey Company
 Cleveland, Ohio

[54] NUMERICALLY CONTROLLED MACHINE TOOL INCLUDING ZERO OFFSET CONTROL
 20 Claims, 1 Drawing Fig.
[52] U.S. Cl. .................................................. 318/572,
 318/603, 235/151.11
[51] Int. Cl. ...................................................... G05b 19/24
[50] Field of Search ........................................... 318/603,
 572

[56] References Cited
 UNITED STATES PATENTS
3,218,532 11/1965 Toscano ........................ 318/20.120

| | | | |
|---|---|---|---|
| 3,340,447 | 9/1967 | McDonald | 318/20.120 X |
| 3,343,053 | 9/1967 | Toscano et al. | 318/20.120 |
| 3,449,554 | 6/1969 | Kelling | 318/20.120 X |
| 3,453,549 | 7/1969 | Payne et al. | 318/20.120 X |

Primary Examiner—T. E. Lynch
Attorney—Yount and Tarolli

ABSTRACT: A numerically controlled machine tool having offset storage means separate from the stored program for controlling the movement of a slide with the offset storage means being responsive to coded data in the stored program to introduce an offset in the position of the slide by supplying pulses to a pulse-responsive circuit which is part of a servo means for moving the slide. The offsetting means is operable to first remove existing offset and then to introduce a new offset and to render electronic controls normally operable in response to the stored program to position the slide ineffective until the change in offset is effected when the latter is called for by the stored program.

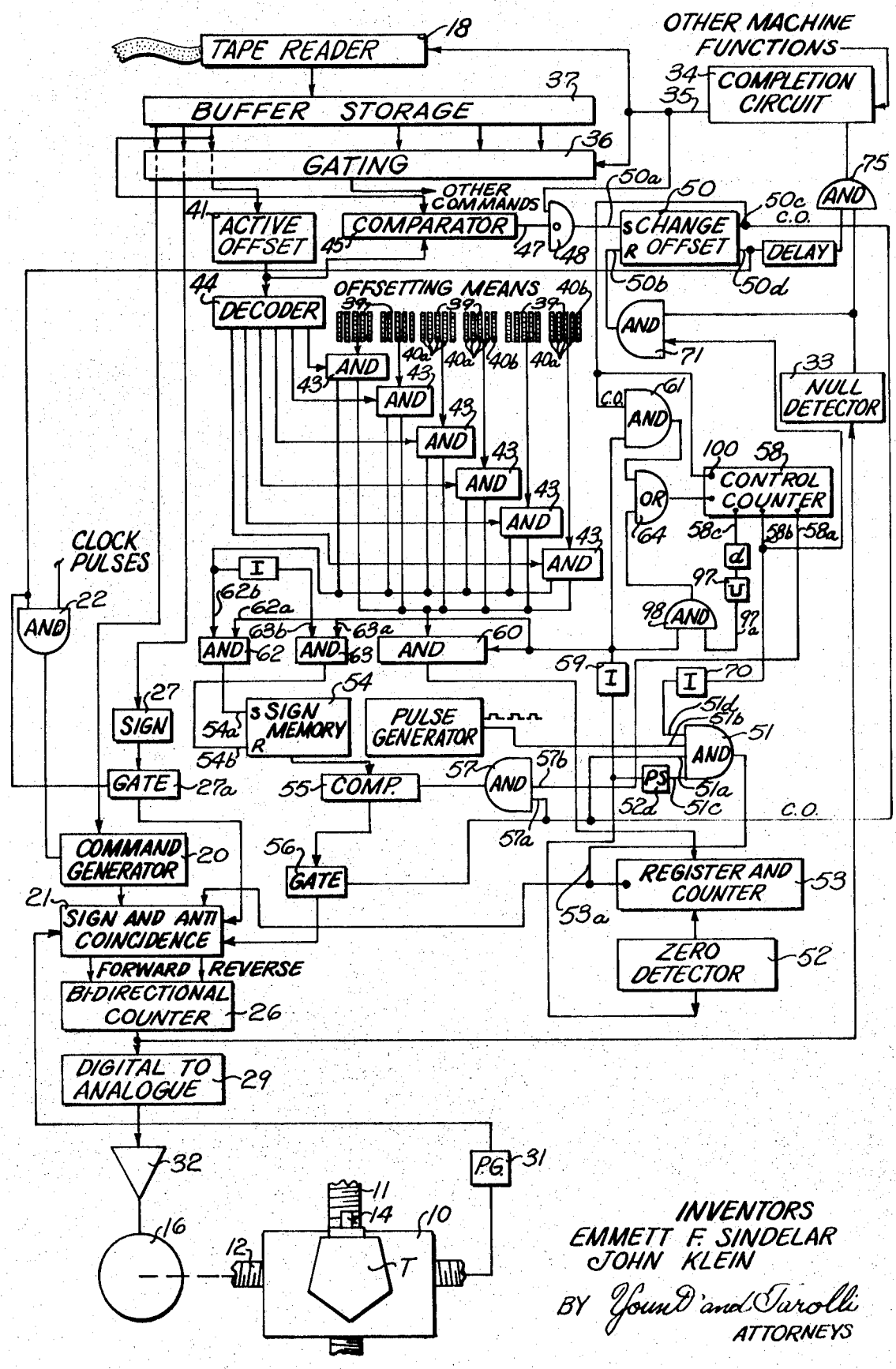

NUMERICALLY CONTROLLED MACHINE TOOL INCLUDING ZERO OFFSET CONTROL

The present invention relates to numerically controlled machine tools and more particularly, to a method and apparatus for enabling an operator to introduce an offsetting of the position of a member being controlled by a previously prepared program from a position which it would have in response to the program. In a numerically controlled machine tool, the movements of the members mounting tools or workpieces are under the control of a previously prepared program, for example, a magnetic tape having coded information there including information dictating the direction and rate of movement of the member and the distance which the member is to be moved to effect a forming of the workpiece.

The commands for controlling the movement and position of the member being controlled conventionally direct the member to be moved specified distances either from a machine reference or from a predetermined position. During the preparation of the program it is assumed the specified movement will relatively locate the workpiece and the tool at the proper position for effecting the desired operation or shape of the workpiece. However, due to different types of tools, tool wear and various other factors well known to those skilled in the art, the optimum or proper position of the member being controlled may actually be offset from the position to which the member is moved in response to the coded information. In the machine illustrated and disclosed herein, the program may be prepared so that the operator of the machine can introduce data into the control system to cause the slide to move to a position which is greater or less than that position programmed onto the tape by an amount selected by the operator. The amount by which the operator can in effect change the reference position of the member is referred to herein as offset since it enables the operator to offset the member to position the member in a position different from that called for by the program.

An object of the present invention is to provide a numerically controlled machine tool in which manually settable storage can be set by the operator of the machine to select a predetermined number of position-offsetting pulses to be applied, in response to coded data in a stored program, to servo means for operating a member whose position is controlled by the stored program.

Another object of the invention is to provide a new and improved numerically controlled machine tool in which offsetting means for offsetting a movable member from that position commanded by a stored program having commands which are read in sequence to sequentially control electron positioning means to move the member to various positions commanded by the program is settable to effect an offsetting of the member from the commanded position and is such that it first supplies pulse signals to remove existing offset and then supplies pulse signals to introduce the new offset, each pulse signal representing an increment of movement.

Yet another object of the present invention is to provide a new and improved numerically controlled machine tool which is controlled in response to a stored program by electronic means successively set by the program to effect movement of a member to successive positions and in which manually set offsetting means is actuated in response to data in the stored program to introduce an offset by supplying pulses to a pulse-responsive circuit and the electronic means is rendered ineffective while a new offset is being introduced.

Yet another object of the present invention is to provide a new and improved program in which a counter counts pulse signals to introduce an offsetting of a member of the machine tool from the position commanded by a stored program in accordance with a separate storage and in which the counter is first set to count pulses for effecting a removal of existing offset.

A still further object of the present invention is to provide a new and improved machine tool in which offset data is introduced into the positioning of a slide by a stored program by operation of offsetting means which, separate from the program, is settable to determine the offset of the slide from that position commanded by the stored program with the machine operating to compare data indicative of the existing offset with data from the stored program and to effect activation of the offsetting means if the comparison indicates that a change is to be made.

In a specific form of the preferred embodiment illustrated and described herein, a cutting tool is mounted on a turret on a slide which is operated under the control of a stored program. The program has commands thereon which are read in sequence and which sequentially command the slide to move in a predetermined manner with the movement directed by each command being a distance measured from the immediate position of the slide. Offset is introduced into the system by shifting the position of the slide at the beginning of a command to effectively subtract from or add to the increment of movement called for the next command to be executed. When an offset is to be introduced or changed, the circuitry first eliminated offset of the slide introduced by a previous command. This is done by applying pulses to a servo to move the slide to eliminate the offset and counting the pulses with a countdown counter which has the amount of offset registered therein. When the counter is counted to zero, sufficient pulses have been introduced to return the slide to its reference position. When an offset is introduced in response to a command, a sign indicative of the direction of offset is stored and when the offset is to be eliminated preparatory to inserting a new offset, the stored sign is complemented. The complemented sign controls the direction of movement of the slide when offset is being removed to cause the slide to move in the direction opposite to that direction in which it was moved to initially introduce the offset. After the offset counter has been counted to zero to remove the offset, the counter and sign circuit are set to the new offset position and pulses are again applied to the servo and the counter is again counted down to offset the slide the desired amount from the reference position. After the counter counts down to zero to introduce the new offset into the servocontrol system, the counter is again preset to store the necessary information. The offset which is introduced into the counter is determined by the settings of one of a plurality of thumb wheel groups which are manually set by the operator. The stored program selects one thumb wheel group which is to control the offset for the command to be executed and a comparator compares the thumb wheel group to be used with the next command with the thumb wheel group last selected and activates the offsetting means if there is a difference.

Referring to the drawings, the sole FIGURE of the drawings diagrammatically illustrates a machine embodying a specific form of the preferred embodiment of the present invention. The machine includes a turret slide 10 which is moved along the axis of a workpiece by a lead screw 11 and transversely of a workpiece supported by a conventional spindle (not shown) rotatable about an axis parallel to the lead screw 11. The movement transversely of the spindle axis is by a lead screw 12 and will be termed y-axis movement while movement by the lead screw 11 will be termed x-axis movement. Slide 10 may be the turret slide of a lathe. Conventionally, the turret slide has an indexible turret T adapted to support a plurality of tools on different turret faces with the turret being indexible to locate a tool 14 mounted on one of the faces in working position for removing material from a workpiece rotated by the spindle of the machine. The drawing illustrates in diagrammatic form the control for only the lead screw 12. However, it will be understood that the lead screw 11 is controlled in a corresponding manner.

The lead screw 12 is operated by a motor 16. The motor 16 as well as the corresponding motor for controlling the lead screw 11 is controlled from a stored program preferably a tape with the program thereon which is read by a tape reader 18. The program may also control other functions of the machine in order to effect automatic operation of the machine in accordance with the tape program to produce the desired shape on the workpiece including the indexing the turret T to move a different tool into working position.

The coded data on the tape is in the form of command blocks, each block having coded data representing a command directing operations or functions to be executed by a machine. The commands are read one at a time by the tape reader 18. When a command is being executed it is stored in active registers which control the machine. When a command has been executed by the machine, a new command is transferred into the active registers. Conventionally, a new command is transferred from a buffer storage and when this occurs the tape reader 18 is activated to read the next command to set the buffer storage in accordance therewith and to step the tape to a position for reading the next following command.

A command generator 20 is set from the buffer storage 19 to supply pulses to a sign and anticoincidence circuit 21 which directs the pulses ever either a forward or reverse line to a bidirectional counter 26 depending upon the setting of a sign circuit 27 which is set from the tape reader 18. The command generator 20 operates in a conventional manner to modify a train of clock pulses applied thereto through an AND-gate 22 to supply a number of pulses to the sign and anticoincidence circuit 21 as dictated by the setting of the command generator.

The pulses applied to the bidirectional counter 26 will be counted by the counter in either an up or down direction depending upon whether the pulses are forward pulses or reverse pulses and each pulse applied to the counter from the command generator 20 calls for an increment of movement of the motor 16 and the slide 10. The counter 26 provides an error count and this error count is converted by a digital-analog converter 29 to an output analog signal which is applied to a power amplifier 32. The signal from the digital-analog converter 29 to the power amplifier 32 has a magnitude dependent on the count in the counter 26 and a polarity which indicates whether the count is above or below a reference count for the counter. The reference count for the counter provides a zero output for the digital-analog converter 29 and indicates that there is no error in the position of the slide 10 while a count different from the reference count signals an error in accordance with the magnitude of the count. A count higher than the reference count calls for operation of the slide 10 in one direction and the count lower calls for the operation of slide 10 in the other direction. As the motor 16 operates in response to an error signal from the bidirectional counter 26, a pulse generator 31 operates to supply feedback pulses to the sign and anticoincidence circuit which are applied to the bidirectional counter over the forward or reverse line to count the counter back toward the reference count. When the reference count is reached the output of the bidirectional counter is zero, indicating that the command set in the command generator 20 has been executed and the motor stops. A null detector 33 operates to detect a null at the output of the bidirectional counter and provides an output signal to a completion circuit which monitors the operations called for by the commands stored in active registers of the machine and provides an output signal on an output 35 when all commanded operations have been executed. The output signals that new command information is to be set in the active storage registers of the machine. The output of the completion circuit 34 is applied to gating circuitry 36 which transfers information stored in a buffer storage 37 to active registers for controlling the machine including the command generator 20 to set the active registers with information in accordance with the next command. The readout from the buffer storage is a nondestructive readout so that information therein is not destroyed by reading out. This makes it unnecessary to again code information in the program when it is the same as the pervious command. The completion circuit 34 output signal may also activate the tape reader 18 to read the next following command and to set the buffer storage for the next following command.

In the illustrated embodiment, the operator can introduce an offset in the position of the slide 10 from its position commanded by the stored program by setting a particular thumb wheel group 39 to indicate the desired offset to be introduced. There are six thumb wheel groups 39 and each group includes thumb wheels 40a for setting a number which is indicative of the magnitude of the offset and the thumb wheel 40b for setting direction or sign of the offset. Each of the thumb wheel groups 39 has a binary code number assigned thereto and an active storage 41 is set by the tape reader to select one of the thumb wheel group effective to introduce an offset into into the position of the slide 10 by operating the lead screw 12. The thumb wheel groups 39 have outputs with binary signals indicative of the setting of the thumb wheels, the outputs for the groups 39 being connected to respective AND-gating circuitry 43 which is rendered effective to transmit the binary signals when an input is applied thereto from a decoder 44 for decoding the code number in the active offset register 41. The decoder will have an output signal on its output connection to the gate corresponding to the thumb wheel group identified by the code number in the active offset register. While a command is being executed by the machine, the code number of the thumb wheel group will be stored in the active offset register 41.

The number which is stored in the active offset register 41 is monitored by a comparator 45 which compares the number in the active offset storage with the number set in the buffer storage. The code number in the buffer storage indicates the set of thumb wheels which is to control the offset during the execution of the next command. If the code number in the storage 41 and the buffer storage are different to indicate a change in thumb wheel groups, the comparator 45 will have an output on a line 47 which is applied to one input of an AND-gate 48. The second input of the AND-gate 48 is connected to the output 35 of the completion circuit 34 so that when a signal appears thereon to effect a gating of a new command into the active registers, the AND-gate 48 is activated to set a change offset circuit 50 to its set state to provide a C.O. signal which indicates that a new offset is to be inserted for the slide 10. The change offset circuit 50 has a set terminal 50a to which the signal from the AND-gate 48 is applied and a reset terminal 50b, a set output terminal 50c on which the C.O. signal appears and a nonoutput terminal 50d on which a C.O. signal appears when the circuit 50 is reset. When the memory circuit 50 is set, it looses its C.O. signal on its terminal 50d.

The C.O. signal normally conditions AND-gating 27a to pass the sign stored in memory circuit 27 to the anticoincidence circuit 21 and this gate is blocked by the loss of the C.O. signal.

Also, the C.O. terminal 50d is connected to one input of the AND-gate 22 for supplying clock pulses to the command generator 20. Consequently, the setting of the change offset memory circuit 50 prevents clock pulses from being applied to the command generator 20 and thereby prevents the command generator from carrying out the command which has been set therein from the buffer storage. The set output terminal 50c of the change offset circuit is also connected to an input 51a of an AND-gate 51 which has an output connected to a countdown terminal 53a of a storage register and counter 53. The AND-gate 51 has a second input 51b to which pulses at a very high frequency from an operating pulse generator are continuously applied and a third input 51c which is connected to the output of a zero detector 52 for detecting a zero count in the storage register and count down counter 53. There is an output from the zero detector 52 conditioning the gate 51 whenever the count in the storage register and counter 53 is different from zero. The AND-gate 51 has a fourth input 51d which is normally conditioned with an input. Consequently, when the change offset circuit 50 is set to provide an input to the terminal 51a of the AND-gate 51, count pulses are normally applied at a very high rate to the storage register and counter 53. The pulses from the AND-gate 51 are also applied to the input of sign and anticoincidence circuit 21 and are directed thereby to the bidirectional counter over either a forward or reverse line depending upon the setting of an offset sign memory 54. The sign memory 54 is connected to the sign and coincidence circuit through a complementing circuit 55 and gating 56 which has an input connected to the set output 50c of the change offset memory circuit 50 so that the gating is conditioned to transmit the sign or the complemented sign from the storage circuit 54 in response to a change offset signal. The sign stored in the memory circuit 54 indicates the direction in which the slide 10 was moved to effect the offset for the previous command. Consequently, to return the slide to its reference position, it is necessary to complement the sign stored in the circuit 54. This is done by complementing circuit 55 in response to an input from an AND-gate 57 which has an input 57b normally conditioned with an input at the start of change in offset sequency and an input 57a conditioned by the C.O. signal from the change offset circuit 50. Consequently, the sign in the memory 54 will be complemented by the circuit 55 until one of the inputs to gate 57 is lost and the pulses from the gate 51 will be applied to the bidirectional counter 26 in a direction to remove existing offset at the start of a change offset operation. The counter 53 has a count stored therein at the beginning of a change offset sequence which indicates the existing offset of the slide 10.

When sufficient pulses have been applied to the storage register and counter 53 and to the sign and anticoincidence circuit 21 to count down the storage register and counter 53 to zero, the zero detector 52 will lost its output signal to the AND-gate 51 to deactivate the gate and to block the further application of pulses to the servosystem. The signal to the AND-gate 51 is applied through a circuit 52a which operates for purposes explained hereinafter to stretch out the zero detection signal and through an inverter 59, and an AND-gate 61, and an OR gate 64 to a counter 58 to establish a count of one therein when the zero detector 52 loses its output in response to the counter 53 being counted down to zero. The AND-gate 61 has one input conditioned by the C.O. signal. The counter 58 has an output 58a on which a signal is present when a zero is established in the counter. The output 58a is connected to the input 57b of the AND-gate 57. Consequently, when the count of one is established in the counter, the output from the AND-gate 57 is lost and the complementing circuit does not operate to complement the output from the offset signal memory circuit 54.

The inverted signal from the zero detector 52 is also applied to gating 60 for gating the count setting of the thumb wheel group 39 selected by active storage 41 to register a new offset count into the storage register and counter 53. Also, the inverted output signal from the zero detector is applied to the inputs 62a, 63a of gates 62, 63 for respectively supplying signals to the set terminal 54a and the reset terminal 54b of the memory circuit 54. The thumb wheel of the selected group for controlling the sign has its output connected to an input 62b of the gate 62 and to an input 63b of the gate 63 through an inverting circuit I. The gates 62 and 63 are AND gates. Consequently, when the zero detector has no output, the AND-gate 62 will have an output if there is a binary 1 set in the thumb wheel for controlling the sign and the AND-gate 63 will have an output if the thumb wheel setting for the sign is a binary 0. Accordingly, the memory circuit 54 will be set in accordance with the sign stored in the sign thumb wheel of the selected thumb wheel group 39.

When the new offset is registered in the storage register and counter 53, the zero detector 52 will again have an output to activate the gate 51 and pulses from the countdown oscillator will again be applied to the sign and anticoincidence circuit 21 and the storage counter 53 through the AND-gate 51. The pulses will count-down the storage counter 53 and when the storage counter is again counted down to zero, the AND-gate 51 will again be closed and the proper number of pulses for effecting the new offset will have been applied to the bidirectional counter 26 under the control of the sign memory circuit 54. The second zero detection will also cause a second count enter in the control counter 58 and the gating 60 will again be activated to preset the storage counter to the number set in the selected thumb wheel group.

When a count of two is established in the control counter 58 in response to the second zero detection, an output appears on an output connection 58b. The output 58b is connected through an inverted 70 to the input 51d of the AND-gate 51. Consequently, as soon as the second count is registered in the counter 58, the AND-gate 15 is conditioned so that it will not operate to pass pulses from the oscillator to the register and counter 53 even though a number is set into register 53 i response to the second output of the zero detection circuit 52.

The output 58b of the counter 58 is also connected to one input of an AND-circuit 71 having its other input connected to the output of the null detector 33. This conditions the AND-circuit 71 to have an output when the null detector 33 detects that there is no error registered in the bidirectional counter 26 which indicates that the slide 10 has been offset to its new position. The output of the AND-gate 71 is applied to the reset terminal 50b of the change offset memory circuit to reset the circuit so that the C.O. signal is lost on its set output 50b and a C.O. signal is established on its NOT-output 50d. The C.O. signal on the NOT-output 50d condition the AND-gate 22 to supply clock pulses to the command generator 20 and is applied with a delay to condition an AND-gate 75 to pass null detection signals to the completion circuit 34. The AND-gate 75 prevents false null detection signals from being applied to the completion circuit 34 during the change offset operation. The delay for the C.O. signal to the gate 75 assures that the command generator will have established an error count in the counter 26 and that there will be no false output from the null detector 33 to the final completion circuit 35 on completion of a change offset operation.

When the existing offset of the member being controlled is zero, the active thumb wheel group will be set to zero. In this case, when a change offset operation is initiated as above described, the count in the storage register and counter 53 will be zero. Consequently, the zero detector 52 will not have an output and no pulses will be applied to the bidirectional counter 26 or the counter 53. In this situation, the establishment of the C.O. signal will cause a count of one to be added to the counter 58 since the AND-gate 61 is conditioned by both the signal from the zero detector and the C.O. signal. Also, the output from the zero detector will condition the AND-circuitry 60 and the gate 62 or 63 to transmit the number and sign set in the selected thumb wheel group to the storage and register counter 53 and to the sign memory 54. Since the control counter 58 loses its zero setting, the AND-gate 57 will not operate to complement the sign and pulses will be applied to the AND-gate 51 to count the register and counter 53 down and to supply pulses to the bidirectional counter 26 to establish a new offset for the slide 10. When the register and counter 53 is counted to zero, the circuit will operate to establish a second count in control counter 58 and to reset the change offset circuit as above described.

When the newly selected offset is zero, the newly selected thumb wheel group 39 will have zero set therein and accordingly after the register and counter 53 has been counted down to remove the offset previously introduced for the slide 10, there will be no change in the register 53 to a nonzero count. Therefore, there will be no loss of the zero detection output from the zero detector 52. Circuitry is provided in the illustrated embodiment to enter a count in the counter 58 in such a situation to establish a count of two in the counter to effect a resetting of the change offset circuit 50 and an enabling of the command generation 20. This circuitry includes a monostable multivibrator 97 having an input connected through a differentiating circuit d to output 58c of control counter 58 which has a signal therein when a count of one is registered in the counter. The leading edge of this signal triggers the monostable vibrator 97. Consequently, when the zero detector 52 detects zero on the first count down of the register and storage counter 53 to remove existing offset, the circuit 97 is triggered to lose an output signal on an output 97a which is connected to one input of an AND-gate 98. The multivibrator circuit 97 will return, after a suitable time delay, to its stable state to reestablish the input on the AND-gate 98. The AND-gate 98 has its other input connected to the output of the inverter circuit 59 so that if an output is present from the inverter signifying that a zero is still registered in the register and counter 53, the AND-gate 98 will be actuated to introduce an additional count through OR-gate 64 in the counter 58 to establish a count of two therein, which, as described above, effects a resetting of the change offset memory circuit and enables the command generator 20 to execute the command stored therein.

The counter 58 has an enable input terminal 100 which is connected to the set output 50c so that a C.O. signal must be present to enable the counter 58. When the C.O. signal is lost, the counter 58 is reset to zero and will not count until the C.O. signal is reestablished.

The pulse stretcher 52a stretches the zero output signal from the detector 52 so that the zero signal is not lost immediately when a new count is established in the countdown counter 53. This allows the counter to settle when being reset.

From the foregoing it can be seen that the offset for the slide 10 from its position commanded by the program is set by the operator in the thumb wheel group 39. The tape reader than automatically operates to select the thumb wheel group in accordance with a prepared program and the circuitry will automatically supply pulses to the pulse responsive bidirectional counter 26 to effect a change in the offset when a new thumb wheel group is selected. In practice, if a turret is being utilized as in the illustrated embodiment, the tool offset for tools mounted on the different turret faces can be set in different predesignated thumb wheels of the thumb wheel groups in accordance with the prepared program. The proper offset may be determined empirically by the operator by either measuring or by taking a rough cut. Also, a program may be prepared so that different commands select different thumb wheel groups for the same tool. For example, one offset group might be utilized for a rough cut and other offset groups might be utilized for a finish cut.

It will be understood that the system as embodied in the machine tool may include a second set of thumb wheel groups corresponding to the thumb wheel groups 39 for controlling the offset of the slide 10 along the x-axis which is the axis along which the slide is moved by the lead screw 11. In such a machine, there will be control circuitry corresponding to that described for the x-axis and for the thumb wheel groups for the x-axis. There will, however, normally be a single change offset circuit 50 which will prevent operation of either the lead screw 11 or the lead screw 12 and of other machine functions in response to active registers set from the tape reader while a new offset is being inserted for either the lead screw 11 or the lead screw 12 or both. In such a case, the AND-circuit 71 would have an input from the control counter for the lead screw 11 and an input for the null detector for the lead screw 11 corresponding to the null detector 33 so that all conditions must be met before the change offset circuit is reset to return the control of the slide 10 to the active registers for executing the command which has been set therein.

In the specific form of the present invention, servo means comprising the motor 16, the sign and anticoincidence circuit 21, the bidirectional counter 26 and the pulse generator are of conventional construction well understood by those skilled in the art. This also true of the various components shown in block form including the command generator 20.

While a particular type of servo means which is adapted to effect an increment of movement in response to a pulse signal has been shown, it will be understood that other types of servos in which a pulse may be applied to effect an increment of movement may be utilized insofar as this aspect of the invention is concerned. For example, the servo means may be of the known type where the coded information in the stored program is in the form of a position number representing a particular position along the path of movement of the slide 10 by the lead screw 11 or 12 as measured with respect to a reference position In such a type of system, the immediate position of the slide is registered in a position counter by algebraically summing pulses from a feedback pulse generator which generates pulses indicative of an increment of slide movement. The pulses are summed by the position counter in accordance with the direction of movement as the slide moves from the reference position. The position number in the counter is compared with the position number of stored command to develop an error signal which causes the drive motor to operate to move the slide to reduce the difference in the numbers to zero. In such a system, the offsetting means would control the servo means by supplying offsetting pulses to the position counter to in effect change the reference position for the position counter.

What is claimed is:

1. In a machine tool control system having pulse-responsive servo means for moving a member an incremental distance along a path for each pulse applied thereto, and a stored program having coded data for effecting successive movements of the member along said path, first means responsive to said coded data for supplying pulses to said servo means to effect movement of said member predetermined distances along said path, and offsetting means for supplying offset command pulses to said servo means for offsetting said member a predetermined distance along said path, said offsetting means having manually adjustable storage means separate from said stored program settable to store data for determining the number of offset pulses to be supplied to said servo means by said offsetting means, and control means responsive to coded data of said program for rendering said offsetting means effective, said offsetting means having pulse-supplying circuit means to supply a pulse train to said servo means for offsetting said member with said pulse train having a number of pulses determined by the data set in said manually adjustable storage means.

2. A machine is defined in claim 1 wherein said offsetting means comprises an active storage which stores data concerning the existing offset of the member and said control means comprises a comparator for comparing the data in said active storage with data from said program concerning the next offset of the member and providing an output signal in response to a difference therebetween.

3. A machine as defined in claim 2 wherein said control means comprises a first control circuit set in response to said output signal to activate the offsetting means and which is reset to render said offsetting means ineffective.

4. A machine as defined in claim 3 wherein said offsetting means comprising counting means presettable to provide a counter output signal after a predetermined count for first counting and stopping pulses to said servo means for removing existing offset of said member and for then counting and stopping pulses for introducing a new offset.

5. A machine as defined in claim 1 wherein said manually adjustable storage means comprises a plurality of manually adjustable storages for storing different offsets and said control means means comprises means responsive to coded data of said program for selecting one of said storages to control the offsetting of said member in accordance with the setting of the selected storage, and said offsetting means comprises first circuit means responsive to said control means indicating a change in selection of said manually adjustable storages by said program for supplying pulses to said servo means in accordance with the magnitude of the existing offset of said member to eliminate the existing offset and for supplying pulses to said servo means in accordance with the newly selected storage to effect an offset as dictated by the newly selected storage.

6. A machine as defined in claim 5 wherein said servo means is operable in different directions in response to forward and reverse pulses, and said first circuit means includes a sign circuit set by the selected storage for directing either forward or reverse pulses to said servo means and means for complementing the setting of said sign circuit to operate said member in the direction necessary to eliminate offset.

7. A machine as defined in claim 5 wherein said offsetting means comprises counter means and means for supplying pulses to said servo means and count signals to said counting means indicative of the number of pulses applied to said servo means, said counter means being presettable to provide a counter output signal after a predetermined count, and means responsive to said counter output signal for stopping said pulses and count signals to said servo means and said counter means.

8. A machine as defined in claim 7 wherein said offsetting means includes second circuit means for setting said counting means in accordance with the manually adjustable storage in response to each counter output signal.

9. In a machine as defined in claim 8 wherein said offsetting means comprises a sign circuit set from said manually adjustable storage means for effecting operation of said servo means in a forward or reverse direction in response to pulses from said offsetting means means for complementing said sign prior to insertion of a new offset, and means responsive to said counter output signal for setting said sign circuit in accordance with said manually adjustable means and to effect control of said offsetting means without complementing.

10. In a machine tool, a member to be moved successive distances to successive positions along a path of movement in accordance with coded commands of a stored program, servo means including a pulse-responsive circuit adapted to produce an increment of movement of said member on the application of a pulse thereto, offsetting means for applying pulses to said pulse-responsive circuit for introducing an offset in the position of said member along said path, said offsetting means having storage means separate from said stored program for storing data indicating the number of pulses to be applied to said pulse-responsive circuit to introduce an offset, activating means responsive to said certain coded commands for first rendering said offsetting means effective to supply pulses to said pulse-responsive circuit for moving said member to remove the existing offset before any new offset is introduced, then rendering said offsetting me ans effective to supply pulses to said pulse-responsive circuit in accordance with the data stored in said separate storage means to move said member in accordance with any new offset.

11. A machine as defined in claim 10 wherein said offsetting means comprises counting means presettable to provide a counter output signal after a predetermined count for first counting and stopping pulses to said servo means for removing existing offset of said member and for then counting and stopping pulse signal for introducing a new offset.

12. In a machine as defined in claim 11 wherein said offsetting means comprises a sign circuit set from data stored in said separate storage means for effecting operation of said servo means in a forward or reverse direction in response to pulses from said offsetting means, means for complementing said sign prior to insertion of a new offset and means responsive to said counter output signal for setting said sign circuit in accordance with data stored in said separate storage means.

13. A machine as defined in claim 11 wherein said offsetting means includes circuit means for presetting said counting means includes circuit me ans for presetting said counting means in accordance with the data stored in the separate storage in response to counter output signals.

14. In a machine as defined in claim 13 wherein said offsetting means comprises a sign circuit set from data stored in said separate storage means for effecting operation of said servo means in a forward or reverse direction in response to pulses from said offsetting means, means for complementing said sign prior to insertion of a new offset, and means sign circuit in accordance with data stored in said separate storage means.

15. A machine as defined in claim 11 wherein said counter means comprises a countdown counter presettable to a count and adapted to count down in response to pulses and zero detector means for providing said counter output signal.

16. A machine as defined in claim 10 wherein said servo means is operable in different directions in response to forward and reverse pulses applied to said pulse-responsive circuit and said offsetting means includes a sign circuit set by said separate storage means for directing either forward or reverse pulses to said pulse-responsive circuit in accordance with the data stored in said separate storage means and means responsive to said activating means for complementing said sign to operate said servo means in a direction to remove the existing offset and means for setting the sign storage in accordance with new offset data when pulses have been applied to eliminate the existing offset.

17. In a machine tool, a movable member, a stored program for effecting the movement of said member to successive positions, said stored program comprising a plurality of commands each adapted to effect movement of said member to a new position, said commands including data indicating that said member is to be offset from the commanded position, manually settable offsetting means for offsetting said member from its position as commanded by said stored program comprising circuit means indicating the existing offset of said member from its position commanded by said stored program, means responsive to said stored program for effecting movement of said member in accordance with a stored command including offset registering means for registering offset data from said program, and means for comparing data set in said circuit means representative of the previous offset and data in said registering means representative of a new offset and responsive to a difference in the data in said circuit means and said registering means representative that the new offset is different from the old offset for activating said offset me ans to introduce a new offset when there is a difference.

18. In a machine, a member to be moved along a path in accordance with coded commands stored in a program, individual ones of said commands comprising coded data commanding movement to a new position along said path, power means for moving said member along said path, first means responsive to said commands for effecting operation of said power means to move said member along said path to now positions, offsetting means comprising a manually adjustable storage means for storing data indicative of a change to be made in the position to which said member is moved in responsive to said commands, offset control means for effecting operation of said power means to operate said power means to change of position of said member in accordance with the setting of said manually adjustable storage means and responsive to said program for rendering said offset control means effective to actuate said power me ans to move said member the distance indicated by said manually adjustable storage and to render said first means ineffective to respond to said program, said offset control means including second means for rendering said first means effective to control said power means in response to said program when said control means has actuated said power means to change the position of said member in accordance with the setting of said manually adjustable storage, said offset control comprising counting means for counting pulses indicative of an increment of movement of said member and for stopping the operation of said power means after predetermined count, and means for setting said counting means in accordance with said manually adjustable storage means and supplying pulses to said power means and to said counting means to effect offsetting of said member to introduce an offset in accordance with said manually adjustable storage and said second means is responsive to said counting means.

19. In a machine as defined in claim 18 wherein the existing offset of said member is stored in said offsetting means and said offset control means includes sequencing means for first supplying pulses to said power means and to said counter to remove existing offset and setting said counter in accordance with said storage and supplying pluses to said power means and to said counter to introduce the new offset.

20. A machine tool as defined in claim 17 wherein said manually settable offsetting means includes a plurality of manually settable storages, any one of which may be selected by said commands to introduce an offset in accordance with the data stored therein, said commands including data for selecting the desired manually settable storage means and said circuit means comprising means for storing an indication of the active manually settable storage means.

* * * * *

UNITED STATES PATENT OFFICE
CERTIFICATE OF CORRECTION

Patent No. 3,626,266         Dated December 7, 1971

Inventor(s) Sindelar, Emmett F. and Klein, John

It is certified that error appears in the above-identified patent and that said Letters Patent are hereby corrected as shown below:

Column 9, line 29, after "means" insert --for moving said member along said path, said servo means--; line 36, after "circuit" insert --by said offsetting means, certain of said coded commands including data which indicates that said offsetting means is to be effective to supply pulses to said pulse responsive circuit--; and line 40, after the comma (,), insert --and--; lines 61 and 62, delete --includes circuit means for presetting said counting means--; and line 69, after "means" insert --responsive to said counter output signal for setting said--.

Signed and sealed this 6th day of June 1972.

(SEAL)
Attest:

EDWARD M. FLETCHER, JR.
Attesting Officer

ROBERT GOTTSCHALK
Commissioner of Patents